United States Patent [19]

Kuriyama

[11] Patent Number: 5,202,923
[45] Date of Patent: Apr. 13, 1993

[54] PORTABLE ELECTRONIC DEVICE CAPABLE OF REGISTERING SUBPROGRAMS

[75] Inventor: Ryouichi Kuriyama, Yokosuka, Japan

[73] Assignee: Kabushiki Kaisha Toshiba, Kawasaki, Japan

[21] Appl. No.: 648,638

[22] Filed: Nov. 27, 1990

[30] Foreign Application Priority Data

Nov. 30, 1989 [JP] Japan .................. 1-311402
Nov. 30, 1989 [JP] Japan .................. 1-311403
Nov. 30, 1989 [JP] Japan .................. 1-311404
Dec. 4, 1989 [JP] Japan .................. 1-315106

[51] Int. Cl.⁵ .................................. H04L 9/00
[52] U.S. Cl. .................................. 380/50; 380/4; 380/23; 380/25; 380/49; 235/380; 340/825.31; 371/21.1; 371/40.1
[58] Field of Search ............ 380/3, 4, 23, 25, 49, 380/50; 235/380, 438, 492; 340/825.31, 825.34; 371/21.1, 25.1, 40.1, 53, 54; 364/200 MS File, 900 MS File, 246.6, 246.9, 265.3, 286.4, 286.5, 944.92, 945.3, 946.1, 949.71, 918.7, 966, 969.4, 969

[56] References Cited

U.S. PATENT DOCUMENTS 4,118,789 10/1978 Casto et al. .................. 364/900
4,827,512 5/1989 Hirokawa et al. .................. 380/23
4,939,353 7/1990 Iijima .................. 235/438

FOREIGN PATENT DOCUMENTS 0213534 3/1987 European Pat. Off. .
2610121 7/1988 France .
2633755 1/1990 France .
2646942 11/1990 France .
2100190 12/1982 United Kingdom .

Primary Examiner—Bernarr E. Gregory
Attorney, Agent, or Firm—Cushman, Darby & Cushman

[57] ABSTRACT

After registration of a subprogram is completed, a flag indicating that the subprogram has been registered is set. The flag is referred to in response to a subprogram registration request from an IC card reader/writer. Registration of the subprogram is performed only when the flag is not set. A BCC of the subprogram is calculated and stored in a memory upon subprogram registration. When the registered subprogram is to be executed, a BCC of the subprogram read out from the memory is calculated and compared with the BCC stored in the memory. The subprogram is executed only when the two BCCs coincide with each other. If the subprogram has been registered, a BCC check is performed for the registered subprogram. If the BCC check indicates an error, registration of the subprogram is enabled.

21 Claims, 10 Drawing Sheets

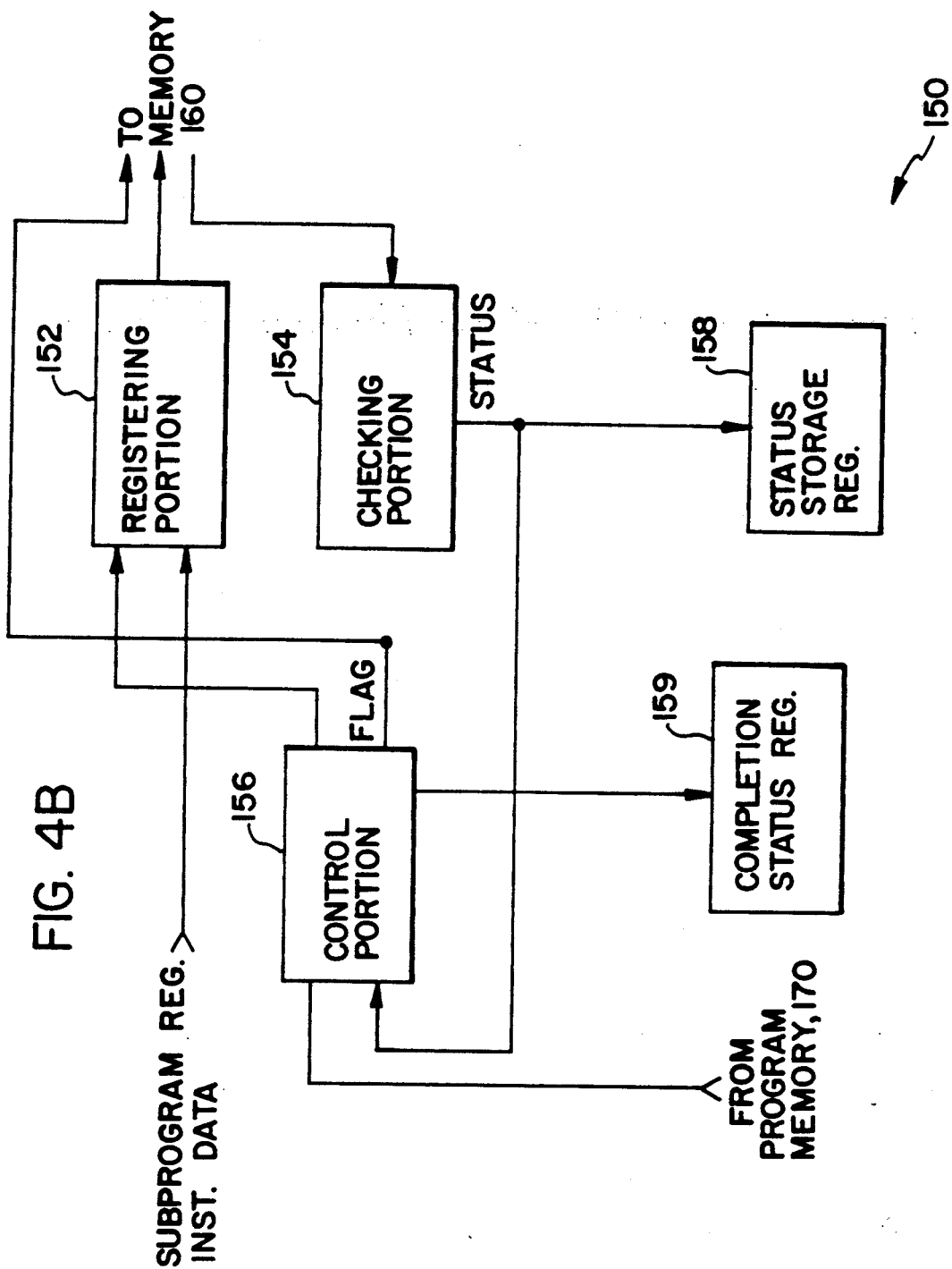

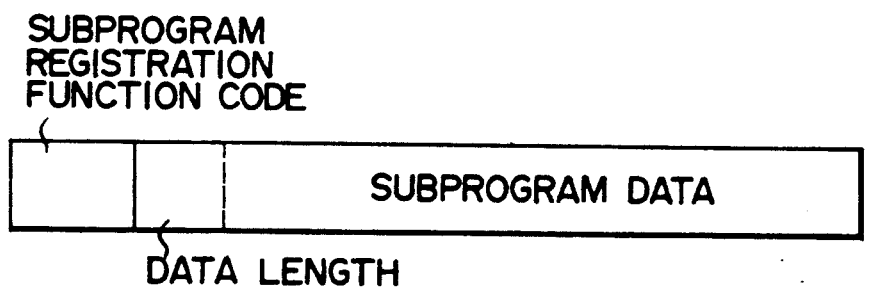
F I G. 5

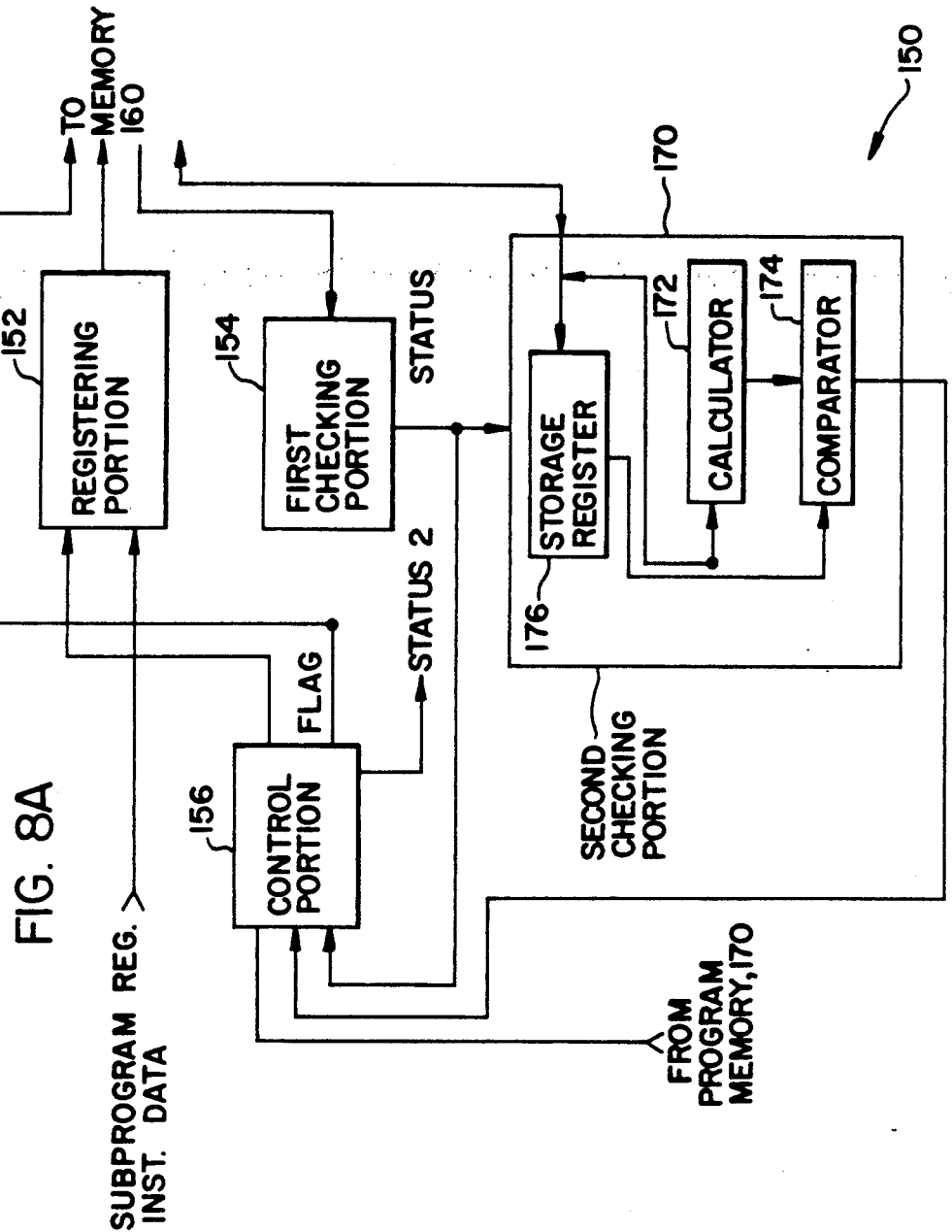

PORTABLE ELECTRONIC DEVICE CAPABLE OF REGISTERING SUBPROGRAMS

BACKGROUND OF THE INVENTION

1. Field of the Invention

The present invention relates to a portable electronic device called an "IC card" incorporating an IC (Integrated Circuit) chip having an erasable nonvolatile memory and a control element such as a CPU and, more particularly, to a portable electronic device in which subprograms to be executed by a control element can be registered in a nonvolatile memory.

2. Description of the Related Art

In recent years, an IC card incorporating an IC chip having an erasable nonvolatile memory and a control element such as a CPU has been developed as an advanced portable data storing medium. In such an IC card, the internal control element accesses the internal memory to input/output necessary data in accordance with a request from external equipment.

As an IC card of this type, an IC card in which subprograms (e.g., an encryption program used in a data write mode) to be executed by a main program of the card can be registered in a nonvolatile memory has been developed.

In a conventional IC card of this type, however, since subprograms can be registered a number of times, the subprograms may be illegally rewritten.

In addition, in order to execute a subprogram, whether data in the subprogram is valid must be checked. If the subprogram is invalid, an operation error is caused.

Furthermore, in order to execute a subprogram, whether the subprogram is registered must be checked. Otherwise, whether the subprogram is to be executed cannot be determined.

SUMMARY OF THE INVENTION

It is an object of the present invention to provide a portable electronic device which can prevent a subprogram from being illegally rewritten after registration, checks upon execution of a subprogram whether the subprogram is registered and data in the subprogram is valid, and if a subprogram is already registered, enables registration of the subprogram only when it determines that data in the subprogram is invalid.

According to a first aspect of the present invention, a portable electronic device comprises: erasable nonvolatile memory means capable of storing a subprogram and data supplied from external equipment; subprogram registering means for registering the subprogram in the nonvolatile memory means; registration information storing means for storing registration information indicating whether the subprogram has been registered in the nonvolatile memory means; and control means for referring to the registration information storing means in response to an externally supplied subprogram registration request command, and allowing the subprogram registering means to register the subprogram only when the registration information indicates that the subprogram has not been registered in the nonvolatile memory means.

According to a second aspect of the present invention, a subprogram registering method in an IC card having a nonvolatile memory for storing data and an externally supplied subprogram and a control element for executing a read/write operation for the memory and the subprogram, comprises the steps of: a) storing registration information indicating that the subprogram has been registered in the nonvolatile memory when the subprogram is registered in the nonvolatile memory; b) referring to the registration information stored in the nonvolatile memory in response to an externally supplied subprogram registration request command to check whether a subprogram has been registered; and c) storing the externally supplied subprogram in the nonvolatile memory only when a determination result obtained in step b) indicates that the subprogram has not been registered.

According to a third aspect of the present invention, a portable electronic device comprises: erasable nonvolatile memory means capable of storing a externally supplied subprogram and data; subprogram registering means for registering the subprogram in the nonvolatile memory means; checking means for checking whether the subprogram data is valid, and executing means for executing the subprogram when the checking means determines that the subprogram data is valid.

According to a fourth aspect of the present invention, a subprogram executing method in an IC card having a nonvolatile data memory for storing data and an externally supplied subprogram and a control element for executing a read/write operation of the data memory and the subprogram, comprises the steps of: a) checking whether the subprogram is valid; and b) executing the subprogram only when a determination result obtained in step a) indicates that the subprogram is valid.

According to a fifth aspect of the present invention, a portable electronic device comprises: erasable nonvolatile memory means capable of storing an externally supplied subprogram and data; subprogram registering means for registering the subprogram in the nonvolatile memory means; and storing means for storing information indicating that the subprogram has been registered after registration of the subprogram is completed.

According to a sixth aspect of the present invention, a subprogram registering method in an IC card having a nonvolatile data memory for storing data and an externally supplied subprogram and a control element having a function of executing a data read/write operation for the data memory and the subprogram, comprises the steps of: a) storing the subprogram in the nonvolatile data memory; b) writing registration information indicating that the subprogram has been registered in the nonvolatile data memory; c) referring to the registration information to check whether a subprogram has been registered; and d) interrupting execution of the subprogram when a determination result obtained in step c) indicates that the subprogram has not been registered.

According to a seventh aspect of the present invention, a portable electronic device comprises: erasable nonvolatile memory means capable of storing an externally supplied subprogram and data; subprogram registering means for registering the subprogram in the nonvolatile memory means; registration information storing means for storing registration information indicating whether the subprogram has been registered in the nonvolatile memory means; program registration checking means for referring, upon registration of the subprogram, to the registration information stored in the registration information storing mean to check whether the subprogram has been registered; validity checking means for checking validity of the subprogram when the program registration checking means determines that the subprogram has been registered; and enabling means for enabling registration of the subprogram when the validity checking means determines that the subprogram is invalid.

According to an eighth aspect of the present invention, a subprogram registering method in an IC card having a nonvolatile data memory for storing data and an externally supplied subprogram and a control element having a function of executing a data read/write operation for the data memory and the subprogram, comprises the steps of: a) checking whether the subprogram has been registered in the nonvolatile data memory b) performing a BCC (block check character) check for the subprogram when the subprogram has been registered; and writing the subprogram in the nonvolatile data memory when the BCC check indicates an error.

According to the present invention, upon registration of a subprogram, the subprogram can be registered only when it is determined that the subprogram has not been registered yet. Therefore, registration of a subprogram can be performed only once. As a result, a subprogram can be prevented from being illegally rewritten after it is registered.

In addition, since validity check information stored in the validity check information storing means is checked upon execution of a subprogram, whether data in the subprogram is valid can be checked. As a result, since the subprogram can be executed only when the subprogram data is determined to be valid, an operation error can be prevented.

Furthermore, since identification information stored in identification information storing means is referred to upon execution of a subprogram, whether the subprogram has been registered can be checked. As a result, whether a subprogram is to be executed can be determined upon execution of the subprogram.

Also, if it is determined upon registration of a subprogram that the subprogram has already been registered, validity of data in the subprogram is checked. The subprogram can be registered again only when the data is determined to be invalid. As a result, a subprogram area can be effectively used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B show a first embodiment of the present invention;

FIG. 5 is a view showing a format of subprogram request instruction data supplied from the terminal station to the IC card of the present invention;

FIG. 8A shows the control element of FIG. 4A according to a second embodiment of the present invention;

DETAILED DESCRIPTION OF THE PREFERRED EMBODIMENTS

Figure 1:
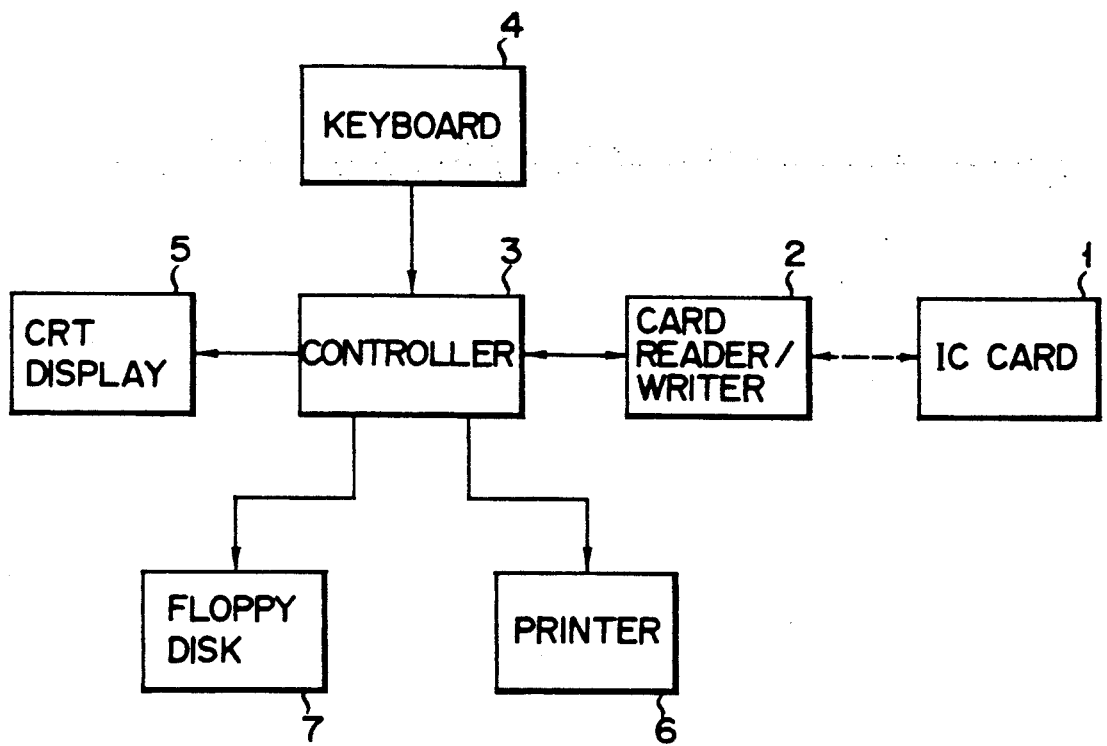
FIG. 1 is a block diagram showing an arrangement of a terminal station for processing an IC card as a portable electronic device according to the present invention.

FIG. 1 shows an arrangement of a terminal station for processing an IC card as a portable electronic device according to the present invention. This terminal station has a controller 3. The controller 3 is constituted by, e.g., a microprocessor chip. An IC card 1 can be connected to the controller 3 via a card reader/writer 2. The controller 3 is connected to a keyboard 4, a CRT display unit 5, a printer 6, and a floppy disk unit 7.

Figure 2:
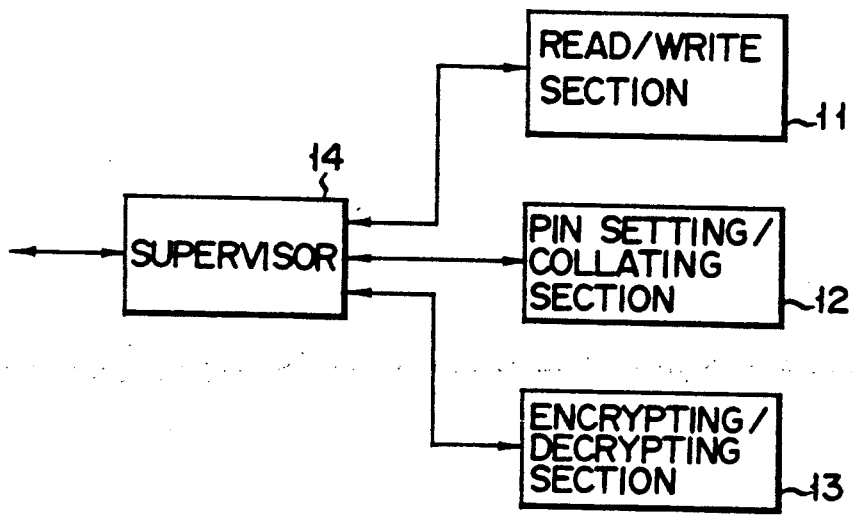
FIG. 2 is a functional block diagram of a general IC card.

The IC card 1 is carried by a user to refer to a personal identification number (to be referred to as a PIN hereinafter) which is known to only the user. The PIN number enables the user to access the card, for example to access credit information during shopping, or to store data if necessary. FIG. 2 is a functional block diagram of the IC card 1. As shown in FIG. 2, the IC card 1 is functionally constituted by sections for executing basic functions such as a read/write section 11, a PIN setting-/collating section 12, and an encrypting/decrypting section 13, and a supervisor 14 for managing these basic functions. The read/write section 11 reads, writes, and erases data with respect to a data memory 16 (to be described later). The PIN setting/collating section 12 performs storage and read inhibit processing for a PIN set by a user and collates a PIN after it is set, thereby giving permission for subsequent processing. The encrypting/ decrypting section 13 encrypts data to be transmitted from the controller 3 to another terminal station via a communication line in order to prevent leakage or forgery of the data, and decrypts encrypted data. The supervisor 14 decodes a function code input from the card reader/writer 2 or a function code added with data and selectively executes a required function of the above basic functions.

Figure 3:
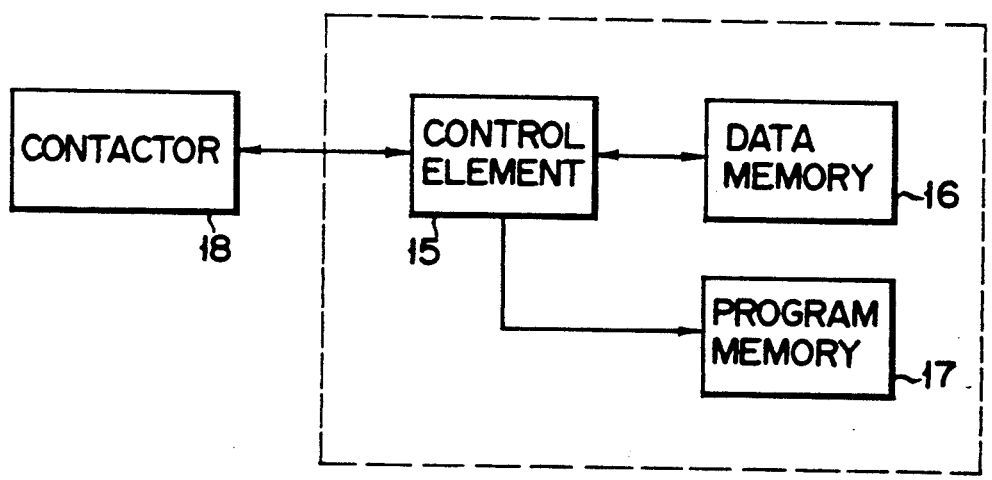
FIG. 3 is a block diagram showing an arrangement of an IC chip incorporated in the IC card shown in FIG. 2.

In order to execute the above functions, the IC card 1 is constituted by a control element as a controller such as a CPU 15, a data memory 16, a program memory 17, and a contactor 18 for obtaining an electrical contact with the card reader/writer 2, as shown in FIG. 3. A portion surrounded by a broken line (the control element 15, the data memory 16, and the program memory 17) is constituted by a single IC chip or a plurality of IC chips and embedded in an IC card main body.

The program memory 17 is constituted by, e.g., a mask ROM and stores control programs including subroutines for realizing the basic functions as described above. The control programs are executed by the control element 15.

The data memory 16 is used to store various types of data and constituted by an erasable nonvolatile memory such as an EEPROM (electrically erasable programmable read only memory).

Figure 4A:
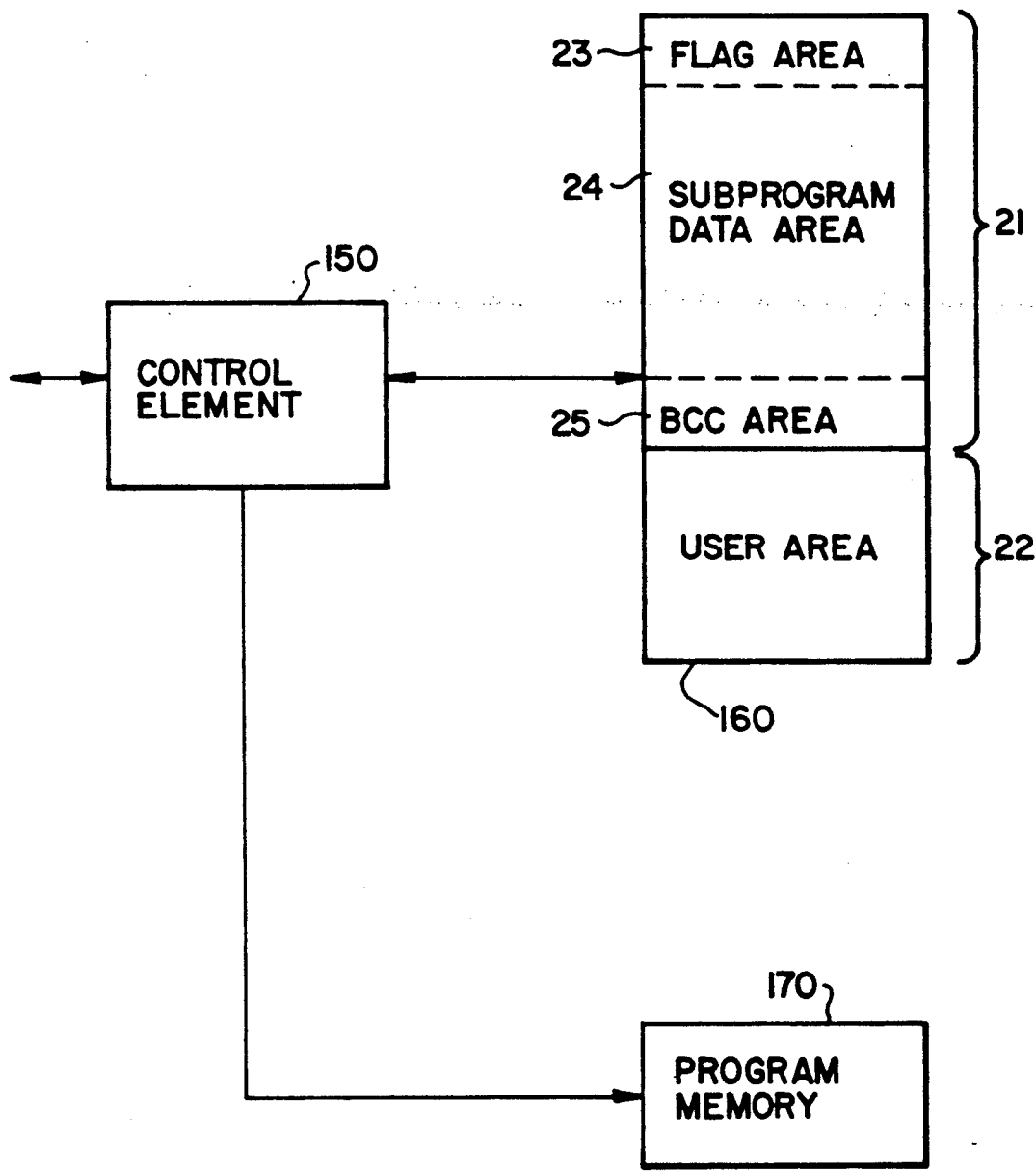

FIG. 4A shows a block diagram showing an arrangement of an IC chip according to the present invention. The IC chip includes a control element 150 which is capable of performing the functions of control elements 15 shown in FIG. 3. The data memory 160 includes the features of the data memory 16 of FIG. 3, and is used to store various types of data and is constituted by an erasable non-volatile memory such as an EEPROM. The program memory 170 stores control programs including subroutines for realizing the basic functions as described above. The control programs stored in program memory 170 are executed by the control element 150. Although not shown in FIG. 4A, the control element 150 is connected to contactor 18 for obtaining an electrical contact with the card read/write 2.

FIG. 4B shows a block diagram of the control element 150. Control element 150 includes registering portion 152 for registering a program into the memory 160. A checking portion 154 checks whether the program has been registered in the memory 160 and outputs a STATUS signal to a control portion 156. The control portion 156 allows the registering portion 152 to register program registration instruction data when the status signal indicates that the program has not been registered in the memory 160. The control element 150 also includes a status storage register 158 which stores the status signal from the checking portion 154. The status storage register 158 functions as an output means for externally outputting status data indicating that the program has already been registered, whereby the registration information from memory 160 indicates that the program has been registered. Control element 150 also includes a completion status register 159 which stores information indicating that the program has been registered after registration of the program is completed. As shown in FIG. 4A, the data memory 160 is divided into a subprogram area 21 and a user area 22. Subprograms are registered in the subprogram area 21. This registration is performed by registering portion 152 of control element 150 when the control portion 156 of control element 150 executes a subprogram registration command. A registered subprogram is called from a main program stored in the program memory 170.

The subprogram area 21 is constituted by a flag area 23 for storing a flag for checking by checking portion 154 whether a subprogram has been registered, a subprogram data area 24 for storing subprogram data, and a BCC (Block Check Character) area 25 for storing a calculated result of an exclusive OR of all data stored in the flag area 23 and the subprogram data area 24. The user area 22 stores various types of data to be stored.

An operation of the embodiment of the present invention will be described below.

In order to register a subprogram in the data memory 160, subprogram registration instruction data having a format as shown in FIG. 5 is input into registering portion 152. This instruction data is constituted by a subprogram registration function code, a subprogram data length, and subprogram data.

Figure 6:
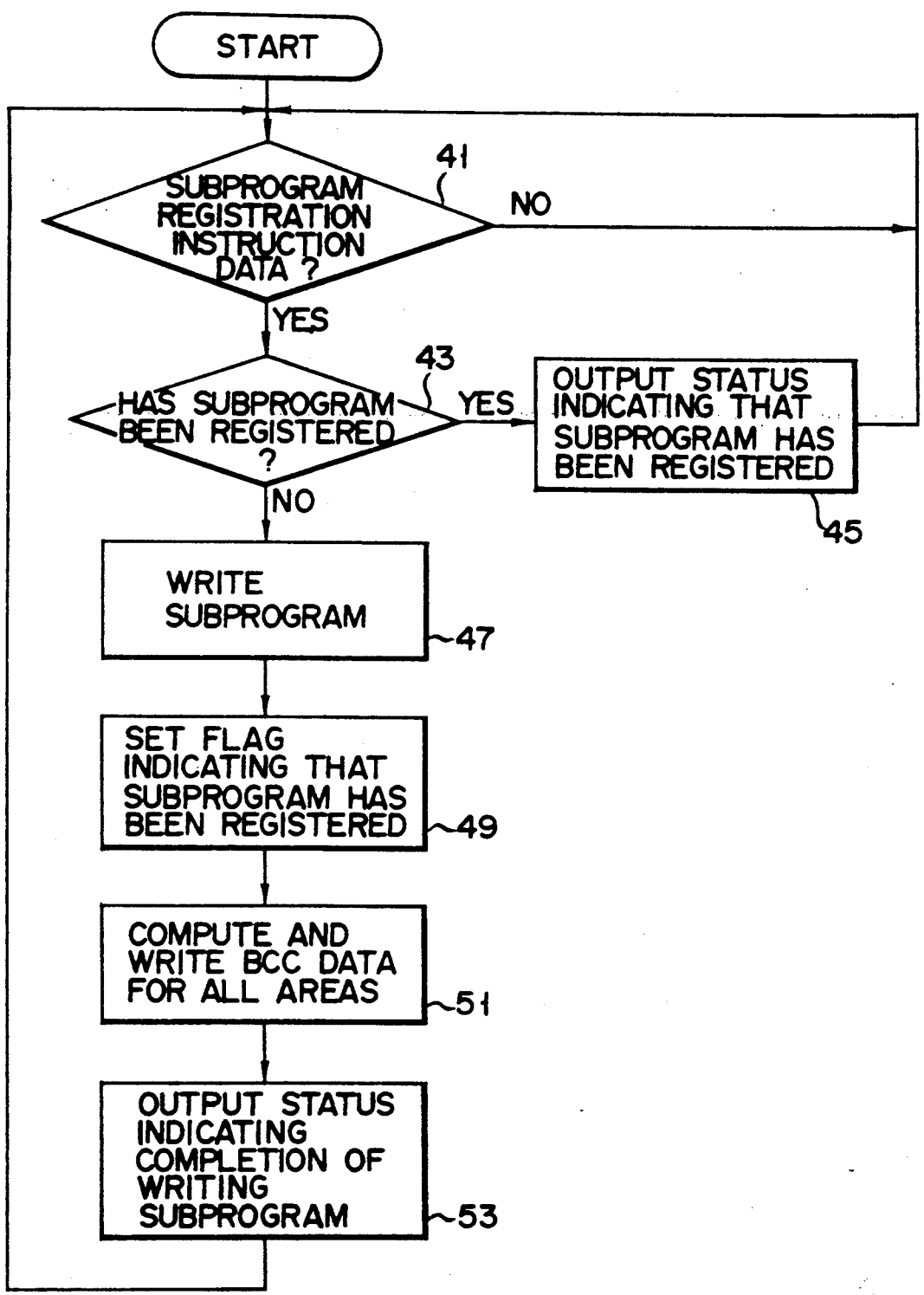
FIG. 6 is a flow chart showing subprogram registration processing.

A subprogram registration operation is performed i accordance with a flow chart shown in FIG. 6. Referring to FIGS. 4B and 6, if the control element 150 determines in step 41 that the subprogram registration instruction data is sent from the terminal station shown in FIG. 1, the checking portion 154 refers to a flag set in the flag area 23 in step 43 to check whether a subprogram has been registered. If the flag is "OO"H, the subprogram has already been registered. In this case, the checking portion 154 of the control element 150 determines that the subprogram has been registered and outputs a status signal status indicating that the subprogram has already been registered in step 45, and the flow returns to the instruction data standby state in step 41.

If the flag is "FF"H, the subprogram has not been registered yet. In this case, checking portion 154 of the control element 150 determines that the subprogram has not been registered and control portion 156 allows registering portion 152 to and write subprogram data of the input instruction data in the subprogram data area 24 in step 47. In step 49, the control portion 156 of control element 150 sets a flag signal flag having a value "OO"H, indicating that the subprogram has been registered, in the area 23 in step 49. In step 51, the control element 15 calculates an exclusive OR of all data stored in the flag area 23 and the subprogram data area 24 and writes the calculation result in the BCC area 25. In step 53, the control portion 156 of the control element 150 outputs a status to completion status register 159 indicating completion of writing the subprogram, and the flow returns to the instruction data standby state in step 41.

Figure 7:
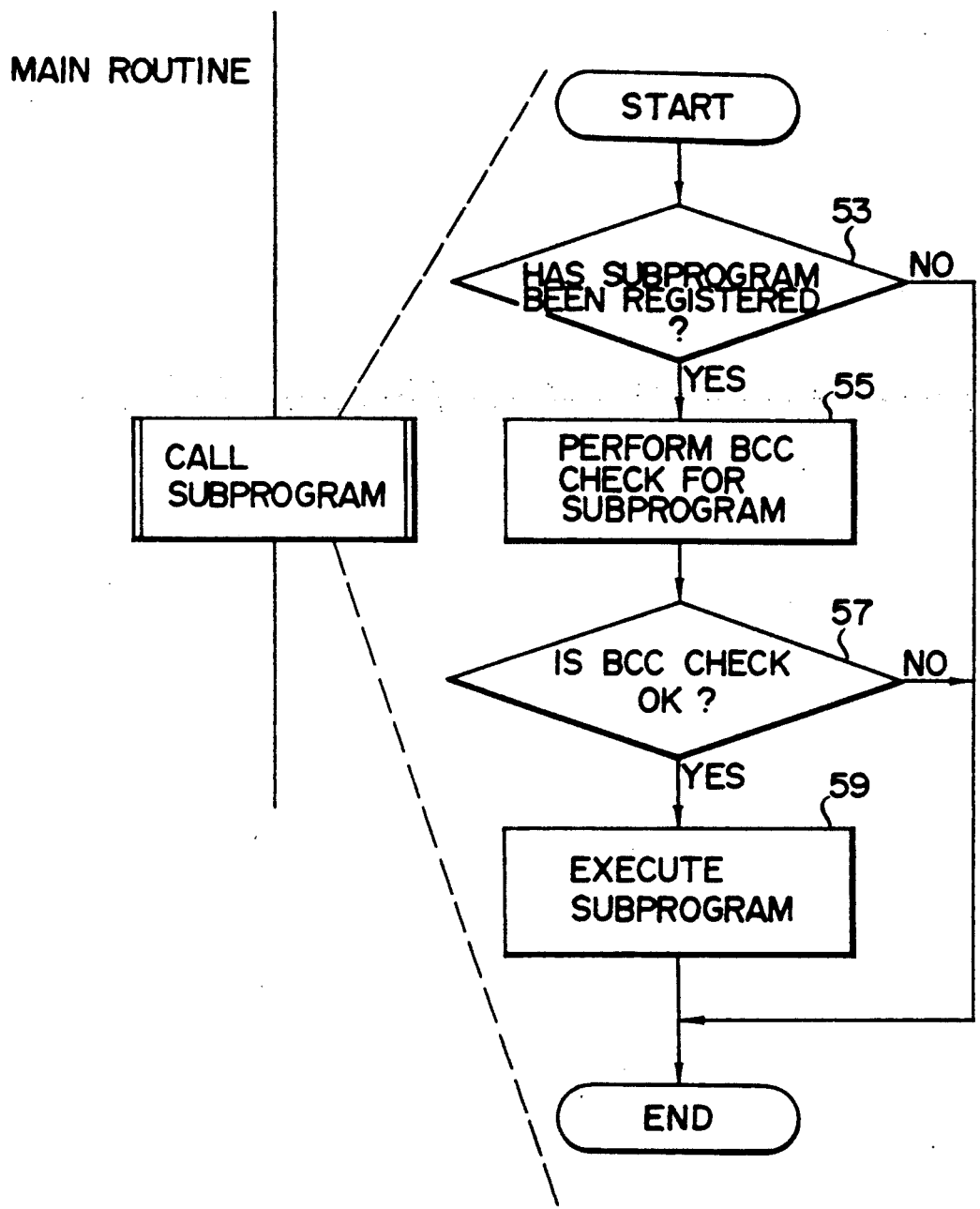
FIG. 7 is a flow chart showing subprogram execution processing.

Calling of a subprogram will be described below with reference to a flow chart shown in FIG. 7. As shown in FIG. 7, a subprogram is called during execution of the main program stored in the program memory 17. In step 53 of the subprogram, the checking portion 154 of control element 150 refers to a flag set in the flag area 23 to check whether the subprogram has been registered. If the control element 150 determines that the subprogram has not been registered (if the flag is "FF"H), it returns to the main program. If the control element 150 determines that the subprogram has been registered (if the flag is "OO"H), it calculates an exclusive OR of all data stored in the flag area 23 and the subprogram data area 24 in step 55. In step 57, the control element 15 compares the calculated result with BCC data stored in the BCC area 25 beforehand. If the two data coincide with each other, the subprogram is executed in step 59, and the flow returns to the main program.

In the above embodiment, however, when a subprogram has already been registered, the subprogram may not be registered again even if data of the subprogram is invalid. A second embodiment capable of eliminating this drawback will be described below with reference to a block diagram shown in FIG. 8A and a flow chart shown in FIG. 8B.

FIG. 8A shows the control element 150 according to a second embodiment of the present invention. The control element 150 according to the second embodiment includes the registering portion 152, the first checking portion 154, and the control portion 156 as described above. In addition, the control element 150 includes a second checking portion 170 which checks the validity of the program when the first checking portion 154 determines that the program has been register.

As described above with reference to FIG. 4A, the BCC area 25 stores the BCC data of the register subprogram. The second checking portion 170 includes a storage register 176 for storing the BCC data from the BCC area 25 upon registration of the registered program. Also, the second portion 170 includes a calculator 172 for calculating an exclusive OR of all the data stored in the flag area 23 and the subprogram data area 24. The calculated result is output from calculator 172 and compared with the BCC data temporarily stored in storage register 176 by comparator 174. The result of comparison is output to the control portion 156.

Figure 8B:
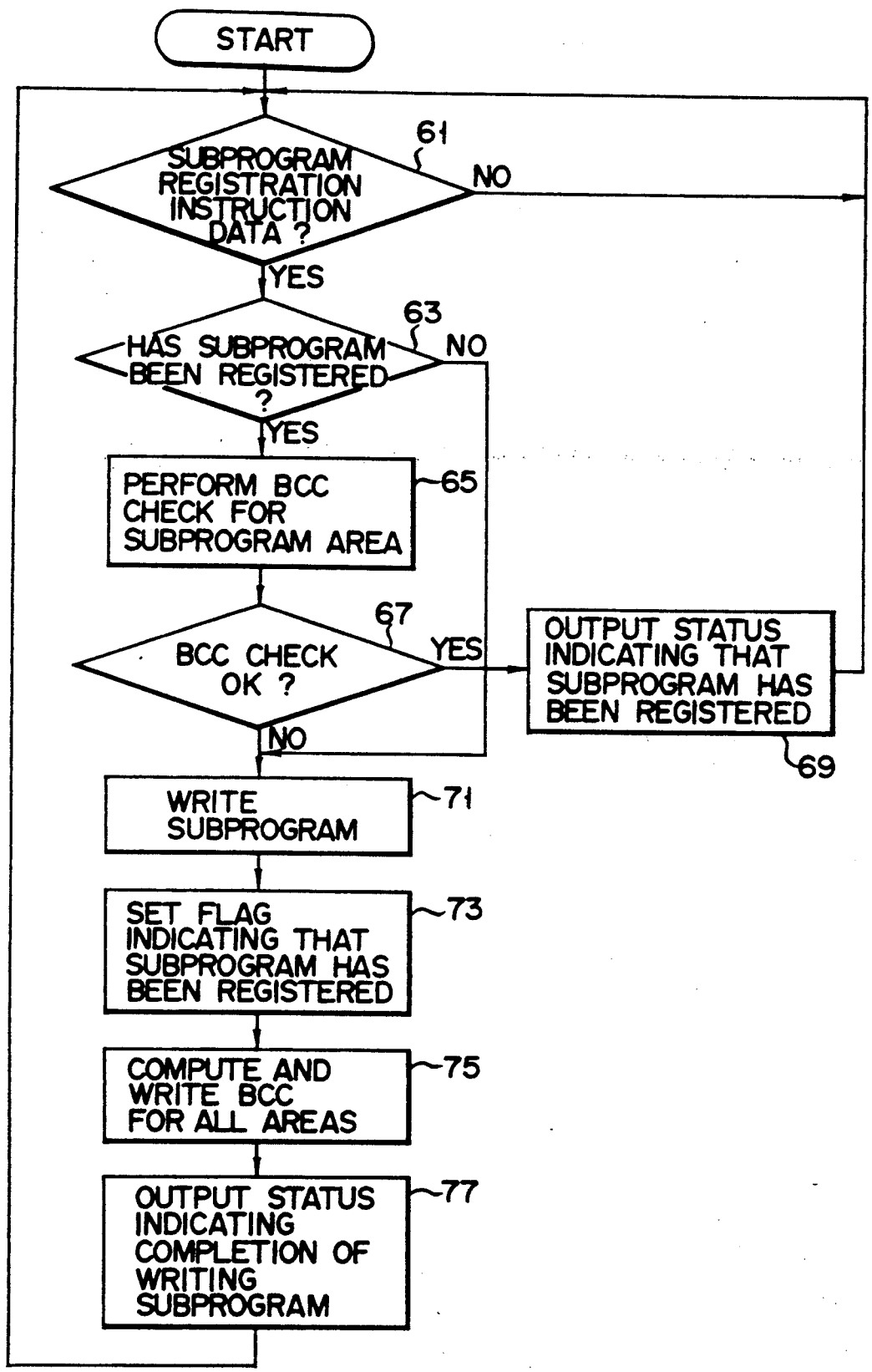
FIG. 8B is a flow chart showing subprogram registration processing according to the embodiment of FIG. 8A.

Referring to FIG. 8B, if the control element 150 determines in step 61 that subprogram registration instruction data is input, the first checking portion 154 refers to a flag set in the flag area 23 in step 63 to check whether a subprogram has been registered. If the flag is "00"H, the subprogram has already been registered. In this case, the first checking portions 154 determines in step 65 that the subprogram has been registered, and the calculator 172 calculates an exclusive OR of all data stored in the flag area 23 and the subprogram data area 24. The comparator 174 and compares the calculated result and the BCC data stored in the storage register 176 retrieved from BCC area 25. If the two data coincide with each other, the control portion 156 determines that subprogram data is valid and outputs a status signals STATUS 2 indicating that the subprogram has been register in step 69, and the flow returns to the instruction data standby state.

If the flag is "FF"H, the subprogram has not been registered yet. In this case, the first checking portion 154 determines that the subprogram has not been registered. If the first check portion 154 determines in step 63 that the subprogram has not been registered or the second check portion 170 determines in step 67 that the BCC check indicates an error, control portion 156 allows registering portion 152 to write subprogram data of the input instruction data in the subprogram data area 24 instep 71 and control portion 156 sets a flag "OO"H indicating that the subprogram has been registered in the flag area 23 in step 73. In step 75, the calculator 172 calculates an exclusive OR of all data in the flag area 23 and the subprogram data area 24 and writes the calculated result in the BCC area 25. When writing is completed, a status indicating completion of writing the program is output by control portion 156, and the flow returns to the instruction data standby state.

In the above embodiment, the BCC of the subprogram area is calculated and written in the BCC area 25 by the control element 150 of the IC card when the subprogram is registered. However, the present invention is not limited to the above embodiment.

Figure 9:
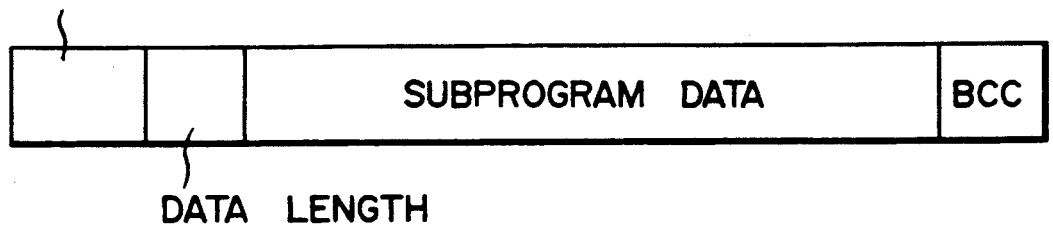
FIG. 9 is a view showing a format of subprogram request instruction data with BCC appended supplied from the terminal station to the IC card of the present invention.

For example, as shown in FIG. 9, the BCC of the subprogram may be calculated by the controller 3 of the terminal and sent to the IC card together with the subprogram. The control element 15 of the IC card is not required to calculate the BCC and simply stores the received BCC in the BCC area 25.

Further, when the subprogram is executed, the control element 150 reads the stored BCC as well a calculate the BCC of the subprogram as similar to the above embodiment (FIG. 7) to thereby check the validity of the subprogram. In this case, the BCC received from the terminal is compared with the calculated BCC to the check the validity of the subprogram. Accordingly, if the subprogram received by the IC card has already been abnormal, the execution of the subprogram can be interrupted.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable electronic device comprising:
   memory means for storing an externally supplied program;
   means for registering the program in said memory means;
   means for checking whether the program has been registered in said memory means and for outputting a check result;
   control means for allowing said program registering means to register the program when the check result of said checking means indicates that the program has not been registered in said memory means, and
   storing means for storing registration information indicating whether the program has been registered in said memory means.

2. A portable electronic device according to claim 1, further comprising storing means for storing information indicating that the program has been registered after registration of the program is completed.

3. A device has output means for externally said control means has output means for externally outputting status data indicating that the program has already been registered when the registration information indicates that the program has been registered in said memory means.

4. A portable electronic device comprising:
   memory means for storing an externally supplied program;
   means for registering the program in said memory means;
   first checking means for checking whether the program has been registered in said memory means;
   second checking means for checking validity of the program when said first checking means determines that the program has been registered; and
   enabling means for enabling registration of the program only when said second checking means determines that the program is invalid.

5. A device according to claim 4, wherein said checking means for checking validity of the program comprises:
   storing means for storing a first check character of the registered program in said memory means upon registration of the registered program;
   means for calculating a second check character according to the program read out from said memory means; and
   means for comparing the calculated second check character with the first check character stored in said memory means.

6. A device according to claim 5, wherein the first check character is externally supplied together with the program.

7. A device according to claim 5, wherein the first check character is calculated upon registering the program.

8. A device according to claim 5, wherein the first and second check characters are block check characters.

9. A device according to claim 4, further comprising means for allowing said program registering means to register the program when said second checking means determines that the program has not been registered in said memory means.

10. A device according to claim 4, further comprising storing means for storing registration information indicating whether the program has been registered in said memory means.

11. A method for registering a program in a portable electric device having a memory comprising the steps of:
   checking whether the program has been registered in said memory and outputting a check result;
   registering the program when the check result of said checking step indicates that the program has not been registered in said memory, and
   storing registration information indicating whether the program has been registered in said memory.

12. A method according to claim 11, further comprising the step of storing information indicating that the registering step has been completed.

13. A method according to claim 11, further comprising the step of externally outputting status data indicating that the program has already been registered when the registration information indicates that the program has already been registered in said memory.

14. A method for registering a program in a portable electronic device having a memory comprising the steps of:
   first checking whether the program has been registered in said memory;
   second checking a validity of the program when said first checking step determines that the program has already been registered; and
   enabling registration of the program only when said second checking step determines that the registered program is invalid.

15. A method according to claim 14, wherein said second checking step comprises the steps of:
   storing a first check character of the registered program in said memory upon registration of the registered program;
   calculating a second check character according to the program read out from said memory; and
   comparing the calculated second check character with the first check character stored in said memory.

16. A method according to claim 15, further including the step of supplying the first check character together with the program.

17. A method according to claim 15, further including the step of calculating the first check character upon registering the program.

18. A method according to claim 15, wherein the first and second check characters are block check characters.

19. A method according to claim 14, further including the step of registering the program when said second checking step determines that the program has not been registered in said memory.

20. A method according to claim 14, further comprising the step of storing registration information indicating whether the program has been registered in said memory.

21. An IC card incorporating an IC chip comprising:
   a contact member for obtaining an electrical contact with an external device;
   nonvolatile memory means for storing an externally supplied program;
   means for writing the externally supplied program into said nonvolatile memory means through the contact member;
   means for checking whether the program has been written into said nonvolatile memory means;
   means for allowing said program writing means to write the program when the check result of said checking means indicates that the program has not been written into said nonvolatile memory means; and
   means for storing registration information indicating whether the program has been registered in said nonvolatile memory means.

* * * * *

UNITED STATES PATENT AND TRADEMARK OFFICE
CERTIFICATE OF CORRECTION

PATENT NO. : 5,202,923

DATED : April 13, 1993

INVENTOR(S) : Kuriyama, Ryouichi

It is certified that error appears in the above-identified patent and that said Letters Patent is hereby corrected as shown below:

On the Title page, item [21], should read--Appl. No. 618,638--.

Signed and Sealed this

Thirtieth Day of November, 1993

Attest:

BRUCE LEHMAN

*Attesting Officer*

*Commissioner of Patents and Trademarks*